(12) United States Patent
Ali et al.

(10) Patent No.: US 8,090,939 B2
(45) Date of Patent: Jan. 3, 2012

(54) DIGITAL CERTIFICATE THAT INDICATES A PARAMETER OF AN ASSOCIATED CRYPTOGRAPHIC TOKEN

(75) Inventors: Valiuddin Y. Ali, Houston, TX (US); Manuel Novoa, Cypress, TX (US); Christopher C. Mohrman, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1055 days.

(21) Appl. No.: 11/256,397

(22) Filed: Oct. 21, 2005

(65) Prior Publication Data

US 2007/0094493 A1 Apr. 26, 2007

(51) Int. Cl.
*H04L 29/06* (2006.01)
(52) U.S. Cl. ........................................ 713/156
(58) Field of Classification Search .................. None
See application file for complete search history.

(56) References Cited

U.S. PATENT DOCUMENTS

| | | | |
|---|---|---|---|
| 6,175,626 B1 | 1/2001 | Aucsmith et al. | |
| 6,367,012 B1 * | 4/2002 | Atkinson et al. | 713/176 |
| 6,854,056 B1 | 2/2005 | Benantar et al. | |
| 6,948,061 B1 * | 9/2005 | Dierks | 713/159 |
| 7,047,409 B1 * | 5/2006 | Aull et al. | 713/173 |
| 7,318,235 B2 * | 1/2008 | Grawrock | 726/26 |
| 2003/0115475 A1 * | 6/2003 | Russo et al. | 713/186 |
| 2004/0117625 A1 | 6/2004 | Grawrock | |

FOREIGN PATENT DOCUMENTS

| | | |
|---|---|---|
| CN | 1514571 | 7/2004 |
| WO | WO 01/06727 | 1/2001 |

OTHER PUBLICATIONS

"X.509 Certificates and Certificate Revocation Lists (CRLs)," last modified May 1, 2001, Copyright 1995-2001 Sun Microsystems, Inc., 5 pp.
CN Office Action dated Apr. 3, 2009, pp. 4.
CN Office Action dated Nov. 13, 2009, pp. 7.
EP Office Action dated Oct. 13, 2009 pp. 3.
Hewlett-Packard Development Company, L.P., Chinese Office Action dated Jun. 8, 2010, Chinese Patent Application No. 2006101365732, filed Oct. 20, 2006, 13 p.
State Intellectual Property Office, P.R. China, Decision on Rejection, Appln No. 200610136573.2, date of issue Dec. 3, 2010, pp. 6.
Translation of State Intellectual Property Office, P.R. China, Decisioin on Rejection, Appln No. 200610136573.2, date of issue Dec. 3, 2010, pp. 10.

* cited by examiner

*Primary Examiner* — Brandon Hoffman

(57) ABSTRACT

In at least some embodiments, a method comprises obtaining a digital certificate that indicates a parameter of a cryptographic token associated with the digital certificate. The method further comprises associating a level of trust with the digital certificate based on the parameter of the cryptographic token.

20 Claims, 4 Drawing Sheets

DIGITAL CERTIFICATE THAT INDICATES A PARAMETER OF AN ASSOCIATED CRYPTOGRAPHIC TOKEN

BACKGROUND

A digital certificate issued by a certificate authority (CA) is able to be stored on or bound to a local computing device through the use of a Cryptographic Service Provider (CSP) or a Public-Key Cryptography Standards (PKCS) module (both hereinafter referred to as "cryptographic service modules" or CSMs). The local computing device may use the certificate to engage in trusted transactions or trusted communications with computer applications (referred to as "challenger applications") that challenge the authenticity of the local computing device or its user. For example, a challenger application may verify the signature of the CA associated with a certificate and allow a trusted transaction or trusted communication based on the verification.

Each digital certificate provides information that identifies the CSM (e.g., by name) used to bind the certificate on the local computing device. However, simply identifying a given CSM does not enable a challenger application to establish trust unless the challenger application has prior knowledge (e.g., hard-coded information) regarding the given CSM and/or the cryptographic token (i.e., the module that performs the cryptography) used by the given CSM. Even if a challenger application has prior knowledge of the given CSM and/or the token that is used by the given CSM, establishing trust based on prior knowledge is not easily scalable (i.e., accounting for new CSMs or tokens is problematic) nor dynamic (i.e., accounting for switches from a CSM or token to another CSM or token is problematic).

BRIEF DESCRIPTION OF THE DRAWINGS

For a detailed description of exemplary embodiments of the invention, reference will now be made to the accompanying drawings in which.

NOTATION AND NOMENCLATURE

Figure 1:
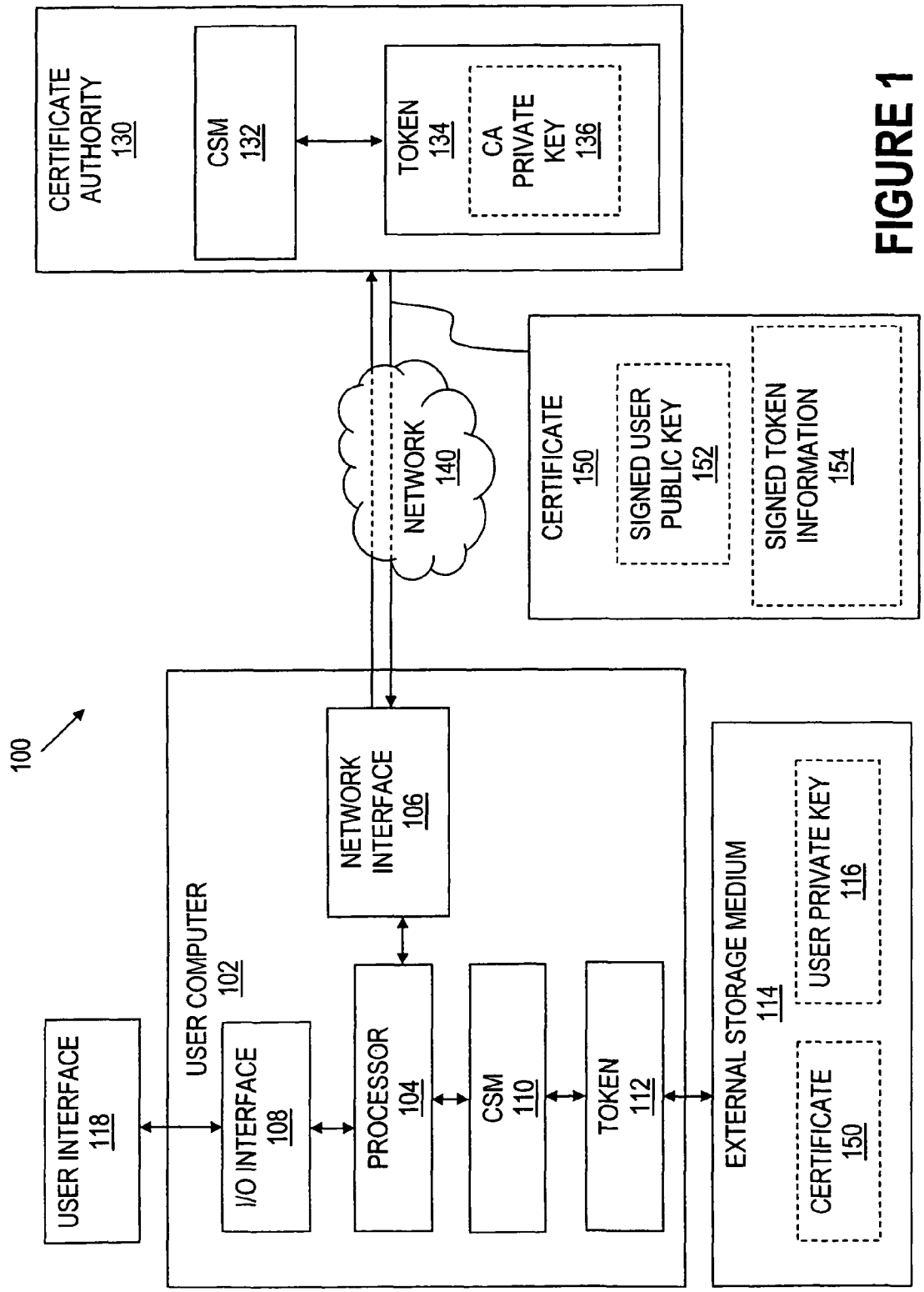
FIG. 1 shows a system in accordance with embodiments of the invention.

Certain terms are used throughout the following description and claims to refer to particular system components. As one skilled in the art will appreciate, computer companies may refer to a component by different names. This document does not intend to distinguish between components that differ in name but not in function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. A "cryptographic token" refers to a hardware module, a software module, or a firmware module (or any combination of these) that protects access to a private key or other secret data using cryptographic techniques.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Embodiments of the invention provide methods and systems for distributing and using information regarding the cryptographic tokens used by Cryptographic Service Providers (CSP) or Public Key Cryptography Standards (PKCS) modules (hereinafter referred to as "cryptographic service modules" or CSMs). In at least some embodiments, the token information is distributed via digital certificates (sometimes referred to as "public-key" certificates) such as X.509 certificates. As will be described herein, Version 3 of the X.509 certificate specification supports an extendable format that is capable of storing the token information as will later be described. However, embodiments of the invention are not limited to X.509 (Version 3) certificates. Rather, any existing or future digital certificate that is capable of transmitting the token information may be used.

As an introduction to embodiments of the invention, a description of public-key certificates and the X.509 specification is provided herein. A public-key certificate is a digitally signed statement from a first entity that indicates the public key (and other information) of a second entity has some specific value. The combination of the public key and the other information represents an identity of the second entity. "X.509" is the name of a commonly encountered standard for public-key certificates. Although other standards exist, X.509 has been a widely accepted standard for public-key certificates. The body responsible for X.509 is the International Telecommunications Union (ITU).

The X.509 specification defines what information can go into a certificate and how it is stored. In accordance with the X.509 specification, a certificate usually contains information such as the certificate holder, the signer, a unique serial number, expiration dates and other fields as shown in Table 1.

TABLE 1

| Certificate Field | Brief Description |
|---|---|
| Version | Identifies which version of the X.509 specifcation applies to this certificate. This affects what type of information can be stored in a certificate. Currently, there are four versions (1, 2, 3 and 4). |
| Serial Number | This field holds a unique serial number per certificate. The serial number is used in many ways, the most common of which is to put the serial number in a certificate revocation list (CRL) when the certificate is revoked. |
| Signature Algorithm Identifier | Identifies the crypto algorithm (HASH algorithm like SHA-1 or MD5) used by the CA to sign the certificate. |
| Issuer | Holds the issuer's Distinguished Name (DN) according to the X.500 specification (so that it is unique across the Internet). |
| Validity | The activation and expiration dates. |
| Subject | The subject's distinguished name. For example, (CN = MyName, OU = My Division, O = MyCompany |

TABLE 1-continued

| Certificate Field | Brief Description |
|---|---|
| | Inc, C = US) |
| Public Key | Pubic key of the subject, an algorithm identifier, and associated special parameters relating the key with a crypto system. |
| Extensions | The extensions are fields only present in Version 3 certificates. |

As shown in Table 1, an X.509 certificate has several data fields. Some but not all of the data fields are discussed herein for convenience in describing at least some embodiments of the invention. The data in an X.509 certificate is encoded using two related standards called Abstract Syntax Notation 1 (ASN.1) and Distinguished Encoding Rules (DER). ASN.1 describes data and DER describes a single way to store and transfer that data.

As shown in Table 1, the "Issuer" field is not just a single string. Rather, the Issuer is a Distinguished Name (DN) which in the Abstract Syntax Notation 1 (ASN.1) is a sequence of several object identifiers (OIDs) with their corresponding values. Some available OIDs to be used in an X.509 Distinguished Name are defined in gnutls/x509.h. The "Version" field indicates which version of the X.509 specification applies to the certificate. For example, a value of "1" may indicate a Version 1 certificate and a value of "3" may indicate a Version 3 certificate. The "Validity" field indicates the date that the specific certificate was activated and the date the certificate's key would be considered invalid.

As shown, the "Extensions" field applies only to X.509 Version 3 certificates. Certificate extensions provide information about the certificate's subject that did not fit in the typical certificate fields. For example, e-mail addresses or a flag that indicates the certificate belongs to a Certificate Authority (CA) may be provided in a certificate's extension. Extensions can be classified in two categories: constraint extensions and informational extensions.

Constraint extensions provide restrictions or constraints on how and where the certificate or the key in a certificate can be used. For example, a constraint extension can limit the usage of the key for Digital Signatures only, or limit a Domain Name for which a CA may issue a certificate, or limit the usage/trust of a certificate to a particular Domain Name. Some common constraint extensions are key usage, extended key usage, and name constraints. Most CA and public-key infrastructure (PKI) systems enforce constraint extensions.

In contrast to constraint extensions, informational extensions provide general information that may or may not be useful for certificate users and is independent of how a certificate can or should be used. Common informational extensions include key identifiers and alternative names (which allows other identities such as data source names (DSNs), email addresses, internet protocol (IP) addresses to also be associated with a certificate's public key). Table 2 shows a list of common certificate extension identifiers for X.509 Version 3 certificates.

TABLE 2

| Extension Identifier | Brief Description |
|---|---|
| subject key id | Identifier of the key of the subject. |
| authority key id | Identifier of the authority's key used to sign the certificate. |
| subject alternative name | Alternative names to subject's distinguished name. |

TABLE 2-continued

| Extension Identifier | Brief Description |
|---|---|
| key usage | Constrains the key's usage of the certificate. |
| extended key usage | Constrains the purpose of the certificate. |
| basic constraints | Indicates whether this is a CA certificate or not. |
| CRL distribution points | Set by the CA in order to inform about the issued certificate revocation lists (CRLs). |

As shown in Table 2, there are several existing extensions for X.509 Version 3 certificates. The extensions are implemented as a linked list (a sequence) of one or more individual extensions. An individual extension has the following elements: an "Extension Identifier" (ExtnID) element, a "Critical" element, and an "Extension Value" (ExtnValue) element. The ExtnID element comprises an Object used as an identifier for the extension and is usually referred to as an Object Identifier (OID). An OID can represent either a constraint extension or an informational extension.

The Critical element comprises a Boolean flag (default is FALSE) that indicates whether an extension is critical or not. The Boolean flag is used to protect CAs against any incorrect assumption or interpretation made by a challenger application or other applications which do not support a particular extension. Thus, if a challenger application does not understand a particular extension marked as Critical (BOOL==TRUE), the challenger application must not make any assumption about the usage of the extension, and either should not continue or should make no use of the information contained in the extension (i.e., the challenger application should ignore the extension). The X.509 Version 3 specification requires that a certificate must be regarded invalid if an unrecognized critical extension is encountered or used.

If the Boolean flag indicates that an extension is non-critical, the non-critical extension can be regarded as a guideline and not a requirement (i.e., a challenger application can freely choose to follow a guideline or not). For example, a non-critical extension that limits the use of a public key for Digital Signatures can be used for encryption. Thus, implementing non-critical constraint extensions is usually ineffective because a challenger application either must ignore or is free to ignore non-critical constraint extensions.

The ExtnValue element provides a string (e.g., an OCTET) containing the value of the extension. In at least some embodiments, the ExtnValue element is used to provide cryptographic token information that can be used to establish trust as will later be described in further detail.

X.509 certificates (with or without extensions) are used in many applications. One application of X.509 certificates is in web browsers that support the Secure Socket Layer (SSL) protocol. SSL is a security protocol that provides privacy and authentication for network traffic. Other technologies that rely on X.509 certificates include, but are not limited to, code-signing schemes, secure e-mail standards, and e-commerce protocols. For example, to enhance e-mail security, a secure e-mail standard may require that both correspondents possess and exchange digital certificates as a pre-condition to the secure email dialogue. Other uses of X.509 certificates include authenticating a user when setting up an encrypted on-line session using virtual private networking (VPN) technology.

As an example of using an X.509 certificate, suppose that a service (a web server) wishes to authenticate a user requesting access. In the set-up process for the transaction, the user presents a certificate which contains his/her public key. In response, the server sends a challenge, which may be a randomly-generated sequence of characters, back to the user's web browser. Upon receiving the challenge (random sequence of characters), the user's web browser encrypts the challenge with the user's private key and returns the encrypted string to the server. Upon receiving the encrypted challenge, the server determines if the encrypted string can be successfully decrypted using the public key supplied in the certificate. Thus, the server confirms the user is in possession of the private key and is thus the person to whom the certificate was issued.

The process described in the above example is sometimes called "Stronger Authentication" as no real secret information (e.g., a password or a private key) ever gets exposed to the Internet traffic. Furthermore, since the challenge data is random and the private key cannot be determined from the public key or other exchanged information, any attacker who manages to capture the data being transferred between the user's web browser, and the server is unable to determine the user's private key or the authentication sequence (at least not in a later session).

There are many available security mechanisms (referred to herein as "cryptographic tokens") to safeguard access to a private key. As with any public-key cryptography scheme, if the private key is compromised, the user's identity can be impersonated. To "measure" the ability of a cryptographic token to protect private keys and other secrets (i.e., not all cryptographic tokens provide the same amount of security), several parameters (characteristics) associated with a cryptographic token can be used. These parameters may be classified as physical parameters and operative parameters. For example, physical parameters such as token type (e.g., hardware, software, firmware) and if and how a cryptographic token is physically bound to a platform (e.g., soldered or removable) can be used to determine the ability of a cryptographic token to protect private keys and other secrets. In some cases, a hardware-based cryptographic token (e.g., a Trusted Platform Module (TPM) or a Smart Card) provides improved security (over software or firmware-based cryptographic tokens) by storing secrets such as the private key and/or hash values and performing internal cryptographic operations using these secrets. These secrets are not available outside the hardware-based cryptographic token. Accordingly, identifying a hardware-based cryptographic token may provide a higher measure of security or "trust" than identifying a firmware or software-based cryptographic token.

Also, operative parameters such as token capabilities (e.g., supported cryptographic operations or key lengths) and token specific information (e.g., platform configuration register (PCR) values or whether a private key is encrypted by the token) can be used to measure the ability of a cryptographic token to protect private keys and other secrets. Other operative parameters include, but are not limited to, how an owner of a cryptographic token accesses the cryptographic token (e.g., via a personal identification number (PIN) or a passphrase). By distinguishing between the different physical and operative parameters of various cryptographic tokens (provided, for example, in a X.509 certificate extension), challenger applications are able to establish some level of trust in the user of a certificate. This trust is separate from and complimentary to existing techniques such as verifying a CA signature and existing private key operations. In at least some embodiments, the physical and/or operative parameters of a cryptographic token may be verified by a challenger application. In such case, a verified physical and/or operative parameter provides an even higher level of trust in the user of a certificate.

In practice, the X.509 specification is implemented in various profiles (i.e., configurations) through different vendors. The primary difference between the X.509 specification and a particular profile from a vendor is that the specification doesn't generally set limitations on what can and can't appear in various certificate types, while a profile sets various limitations based on vendor capabilities and offerings. For example, one such limitation is to require that signing and confidentiality keys be different (as in the Swedish and German profiles). Table 3 shows a list of common X.509 specification profiles.

TABLE 3

| Certificate Profile | Information |
| --- | --- |
| PKIX | Internet Public Key Infrastructure (PKI) profile |
| FPKI | (US) Federal PKI profile |
| MISSI | US DoD profile |
| ISO 15782 | Banking - Certificate Management Part 1:Public Key Certificates |
| TeleTrust/MailTrusT | German MailTrusT profile for TeleTrusT |
| German SigG Profile | Profile to implement German digital signature law |
| Australian Profile | Profile for the Australian PKAF |
| SS 61 43 31 Electronic ID Certificate | Swedish profile |
| FINEID S3 | Finnish profile |
| ANX Profile | Automotive Network Exchange profile |
| Microsoft Profile | A significant de facto profile |

Even the most common official profiles (such as the profiles shown in Table 3) tend to function autonomously such that users of a profile must use the certificate issued under the profile in a manner prescribed by the profile. The X.509 specification does not provide suggestions or guidelines to explain how to make a certificate from one X.509 profile function with other X.509 profiles. Thus, conforming to one profile generally prevents conformance with other profiles unless the profiles happen to match exactly. Furthermore, there is currently no way to mark a certificate to indicate that it should be processed in a manner conformant to a particular profile. Thus, certificate users often don't know how their certificate will be processed by a particular profile.

When challenger applications of a particular profile system receive a certificate, the challenger application determines how much trust to place in the certificate. For example, the challenger application can check the signature on the certificate or request a private key operation. Checking the signature verifies the issuer and indicates that the certificate has not been forged or otherwise tampered with (otherwise the signature verification process would not succeed). If the challenger application is previously configured to trust certificates issued by a given CA, no further determination of trust is needed.

In some cases (e.g., when a given CA is not trusted), a challenger application may verify the checks the issuing CA has been through before issuing the signed certificate. In such case, the challenger application examines the Certificate Policy (CP) and Certificate Practice Statement (CPS) under which the certificate issuing process was carried out. The CP and CPS should indicate how rigorously an individual's identity was checked before he/she was provided with the certificate. While examining the CP and CPS provides some additional information to establish trust (besides verifying the signature), there are other ways to establish trust. As previously described, the physical and/or operative parameters of a cryptographic token may provide an additional measurement of trust. The physical and operative parameters of the cryptographic token indicate the checks that an individual must go through to validate his/her identity on a platform before gaining access to the private key associated with the identity (i.e., trust may be established based on the strength and the validity of where the private key is stored, how the private key is stored, and how the private key is protected).

Identification of the physical and/or operative parameters of a cryptographic token could be used to support a standardized manner for a challenger application to establish additional levels of trust in a particular platform that implements the cryptographic token. For example, verifying that the physical and/or operative parameters of a platform's cryptographic token (as provided in a certificate's extension) have not changed since a certificate was issued (or signed) indicates that the platform is indeed secure. This verification process can be performed using cryptographic techniques.

As an example, if a certificate extension identifies a platform's cryptographic token as a TPM having certain PCR register values (the PCR values indicate configuration settings of the TPM), a challenger application can use a cryptographic verification process to communicate with the TPM and verify the PCR values. In the case of a TPM platform, the challenger application may authenticate the TPM using Pseudo-Anonymous Identities from the Trusted Computing Group (TCG) standard. If the PCR values are the same, the verification process indicates that the TPM is secure (i.e., the TPM's configurations have not changed from when the certificate issued) and that transactions/communications from the platform are also secure. If the PCR values have changed, the verification process indicates that changes have been made to the TPM's configuration since the certificate issued. Thus, the security of the TPM's platform is questionable (i.e., the changes may or may not be valid).

In at least some embodiments, different challenger applications are free to interpret the physical and/or operative parameters independently (i.e., various levels of trust can be established based on the parameters themselves). Also, different challenger applications are free to verify the physical and/or operative parameters and interpret the results of the verification independently (i.e., various levels of trust can be established based on the verification process). Thus, challenger applications are able to establish trust directly from the token information provided with the certificate and/or to establish trust by verifying the token information provided with a certificate extension. This is true even if a certificate is issued based on a first X.509 profile system that does not conform to certificates issued based on a second X.509 profile system (i.e., systems configured to issue and interpret certificates compatible with the second X.509 profile may still establish some level of trust based on the cryptographic token information).

There are many ways to implement an X.509 Version 3 certificate extension so as to provide token information in accordance with embodiments of the invention. Provided below is an example of how the X.509 Version 3 certificate extension could be implemented. However, embodiments of the invention are not limited to the extension implementation provided herein.

As previously described, X.509 certificate extensions have three elements: an "Extension Identifier" (ExtnID) element, a "Critical" element, and an "Extension Value" (ExtnValue) element. For illustrative purposes only, some embodiments may associate the ExtnID element with an OID called "id-token-type-info". The Critical element may indicate that the extension is an informational type extension or is otherwise non-critical. Thus, different challenger applications are free to use the cryptographic token information as a guideline with no requirement to act upon the cryptographic token information.

The ExtnValue element indicates the token information as well as other information. For example, in some embodiments, the ExtnValue element indicates whether private key storage is internal to an associated computer system (i.e., a platform) or is external to the associated computer system (e.g., if the private key is on a USB flash drive or Smart Card). The storage may be identified by a name or other identification. The ExtnValue element also indicates whether the protection provided by the cryptographic token is based on software, firmware, or hardware. The ExtnValue element also indicates other token information such as a token identification number, a token name, a token alias, a standard (specification) related to the token, and a token key strength. The ExtnValue element also indicates token type information such as a size of the information (in Bytes) and whether the private key is migrate-able or non-migrate-able.

If the cryptographic token is based on hardware, the token type information indicates how the token is bound (attached) to a computer system (e.g., soldered or removable). The token type information also indicates a Common Criteria Evaluation Assurance Level (CC EAL) or other conformance criteria. The token type information also indicates a platform certificate uniform resource location (URL), a manufacturer of the cryptographic token, and a manufacturer of a computer system that implements the cryptographic token.

The token information described above for the ExtnValue element is illustrative of some embodiments, but is not exhaustive (i.e., more information, less information or different information could be provided). As described above, the purpose of the token information is to enable a challenger application to establish trust in a user of the certificate either directly (automatically) from the token information or by verifying some or all of the token information. Establishing trust in this manner is separate from and, in some cases, in addition to other techniques for establishing trust such as verifying a certificate signature and some private key operations.

As previously mentioned, information in the extension is encoded using DER encoding as an ASN.1 encoded structure. The extension may be encoded in compliance with a Request for Comments (RFC) standard such as RFC3281. Presented herein are some application programming interfaces (APIs) that allow the manipulation of the extensions of a X.509 Version 3 certificate. APIs are specific to a platform, Operating environment, as well as language syntax used. Thus, the APIs presented herein are illustrative only and embodiments of the invention are not limited to the illustrated APIs.

For illustrative purposes only, some embodiments implement a java.security.cert package that provides APIs that can be used to manipulate an X.509 certificate extension. Specifically, the java.security.cert package includes an interface (i.e., the "X509Extension" interface) that provides public methods to manipulate X.509 Version 3 certificate extensions and X.509 Version 2 certificate revocation lists (CRLs). Table 4 shows some details of APIs that can be used to manipulate extensions.

TABLE 4

| API | Description |
|---|---|
| Set | getCriticalExtensionOIDs( )<br>Gets a Set of the OID strings for the extension(s) marked CRITICAL in the certificate/CRL managed by the object implementing this interface. |
| Byte[] | getExtensionValue(String oid)<br>Gets the DER-encoded OCTET string for the extension value (extnValue) identified by the passed-in oid String. |

TABLE 4-continued

| API | Description |
|---|---|
| Set | getNonCriticalExtensionOIDs( )<br>Gets a Set of the OID strings for the extension(s) marked NON-CRITICAL in the certificate/CRL managed by the object implementing this interface. |
| boolean | hasUnsupportedCriticalExtension( )<br>Check if there is a critical extension that is not supported. |

As an example of using the java.security.cert package to manipulate an extension, the API "getNonCriticalExtensionOIDs" may be used to obtain the OID for the extension that provides token information. The API "getExtensionValue" may be used with the OID assigned to the extension to retrieve an OCTET string value representing the token information. The retrieved information can be parsed based on whatever format was used by a standardizing body (or a developer) to extract relevant information. For example, a standardizing body or developer may parse information using an Extensible Markup Language (XML) schema (i.e., the XML schema can easily be represented as an OCTET string). After the extension has been manipulated, the token information is signed by a CA as part of a digital certificate.

FIG. 1 shows a system 100 in accordance with embodiments of the invention. As shown in FIG. 1, the system 100 comprises a user computer 102 coupled to a certificate authority (CA) 130 via a network 140. The CA 130 is configured to receive a request for a digital certificate from the user computer 102 and in response provides a certificate 150 having a signed user public key 152 and signed token information 154. Alternatively, the CA 130 receives a digital certificate (having a user public key and token information) from the user computer 102 and simply signs (verifies) the received certificate. In either case, the user computer 102 receives the signed certificate 150 from the CA 130.

The certificate 150 can be used by the user computer 102 to participate in trusted transactions, trusted communications, or other trusted actions. In addition to issuing and signing certificates, the CA 130 is configured to verify certificate signatures or other information (such as the token information) during or prior to a trusted action. To issue certificates, sign certificates, or verify signatures, the CA 130 implements a CSM 132 coupled to a cryptographic token 134 that protects the CA's private key 136. Although the CA private key 136 is shown as being stored internal to the token 134, the CA private key 136 could alternatively be stored external to the token 134.

As previously mentioned, the signed certificate 150 is provided to the user computer 102. The signed certificate 150 as well as a user private key 116 can be stored by the user computer 102 in several ways. As shown in FIG. 1, the certificate 150 and the user private key 116 are stored in an external storage medium 114 (e.g., a Flash memory drive or a Smart card) and are accessible via a CSM 110 coupled to a cryptographic token 112. Although the certificate 150 and the user private key 116 are shown as being stored together, separate storage arrangements are possible. In some embodiments, the certificate 150 and/or the user private key 116 are stored internally to the user computer 102. In such case, the certificate 150 and user private key 116 may be encrypted by the cryptographic token 112 and stored in a non-secure memory. Alternatively, the certificate 150 and/or the user private key 116 may be stored securely within the cryptographic token 112 as in the case of a Trusted Platform Module (TPM).

To carry out trusted actions (e.g., transactions such as purchases or communications such as email), a user accesses a user interface 118 that couples to an input/output (I/O) interface of the user computer 102. As an example, the user interface 118 may comprise a graphical user interface (GUI) as well as a keyboard and/or a mouse. Also, in at least some embodiments, the user computer 102 is configured to perform trusted actions using the certificate 150 without human interaction.

Prior to or during a trusted action, the user computer presents the certificate 150 to a challenger application executed by other computers (not shown for convenience) coupled to the user computer 102 via the network 140. A challenger application may establish trust with the user of the certificate 150 by submitting a challenge (typically a random number that must be operated on at the user computer 102 with the user private key 116) to the user computer 102 and verifying the signature of the CA 130 that signed the certificate 150. Based on the results of the verification, a challenger application allows a user to proceed with the trusted action.

As previously described, there may be cases where establishing trust in addition to verifying a signature is desirable (e.g., when a CA is not trusted). In such cases, a challenger application may be configured to establish additional levels of trust directly (automatically) from the token information 154 provided with the certificate 150. Additionally or alternatively, the challenger application may be configured to establish even higher levels of trust by verifying the token information 154 provided with the certificate 150. In some embodiments, verifying the token information 154 strengthens the assumption that the user private key 116 is safe because no changes have occurred to the cryptographic token 112 and/or the platform that protects the user private key 116 since the time the certificate 150 was issued and signed.

Figure 2:
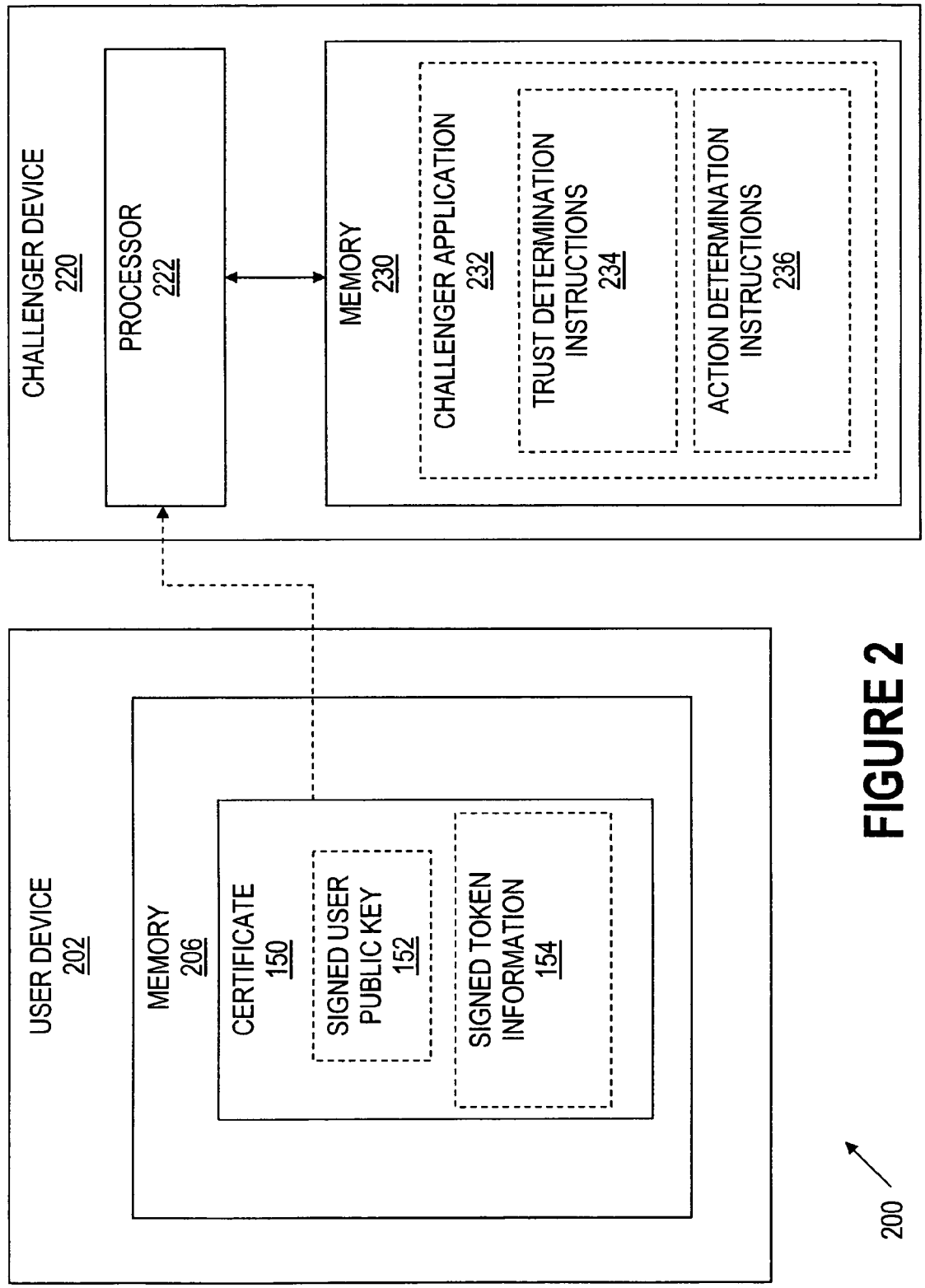
FIG. 2 shows another system in accordance with embodiments of the invention.

FIG. 2 shows a system 200 in accordance with embodiments of the invention. As shown in FIG. 2, the system 200 comprises a user device 202 coupled to a challenger device 220. The user device 202 comprises a memory 206 that stores the certificate 150. As previously described, the certificate 150 comprises a signed user public key 152 and signed token information 154 based, for example, on the CSM 110 and the cryptographic token 112 associated with the certificate 150. In some embodiments, the user device 202 comprises a user computer such as the user computer 102. Additionally or alternatively, the user device 202 comprises a Smart card or a Universal Serial Bus (USB) "Flash" memory. The user device 202 may be portable (hand-held) or non-portable.

The challenger device 220 comprises a processor 222 that couples to a memory 230. The memory 230 stores a challenger application 232 that comprises trust determination instructions 234 and action determination instructions 236. In at least some embodiments, the challenger device 220 couples to the user device 202 remotely (e.g., via a network). For example, the challenger device 220 may be a server that is located remotely from the user device 202. In alternative embodiments, the challenger device 220 couples to the user device 202 locally. For example, if the user device 202 is a hand-held device, the challenger device 220 may be a computer that is configured to access the stored certificate 150 via an appropriate local port or local card reader. In either case, the challenger application 232, when executed, causes the certificate 150 to be retrieved from the memory 206 of the user device 202 and examined.

The trust determination instructions 234, when executed, cause the processor 222 to examine the token information 154 of the certificate 150. The token information 154 comprises token parameters (characteristics) such as physical or operative parameters. For example, token parameters such as token type, binding information, token capabilities or token specific information may be included. Based on the token information 154 and/or a token information verification process, the trust determination instructions 234 determine some level of trust to be associated with the certificate 150 or the certificate's user. Again, the determined level of trust based on the token information 154 is separate from and may be in addition to other procedures for determining trust (e.g., challenging a user/platform to perform a private key operation or verifying the CA's signature).

Figure 3:
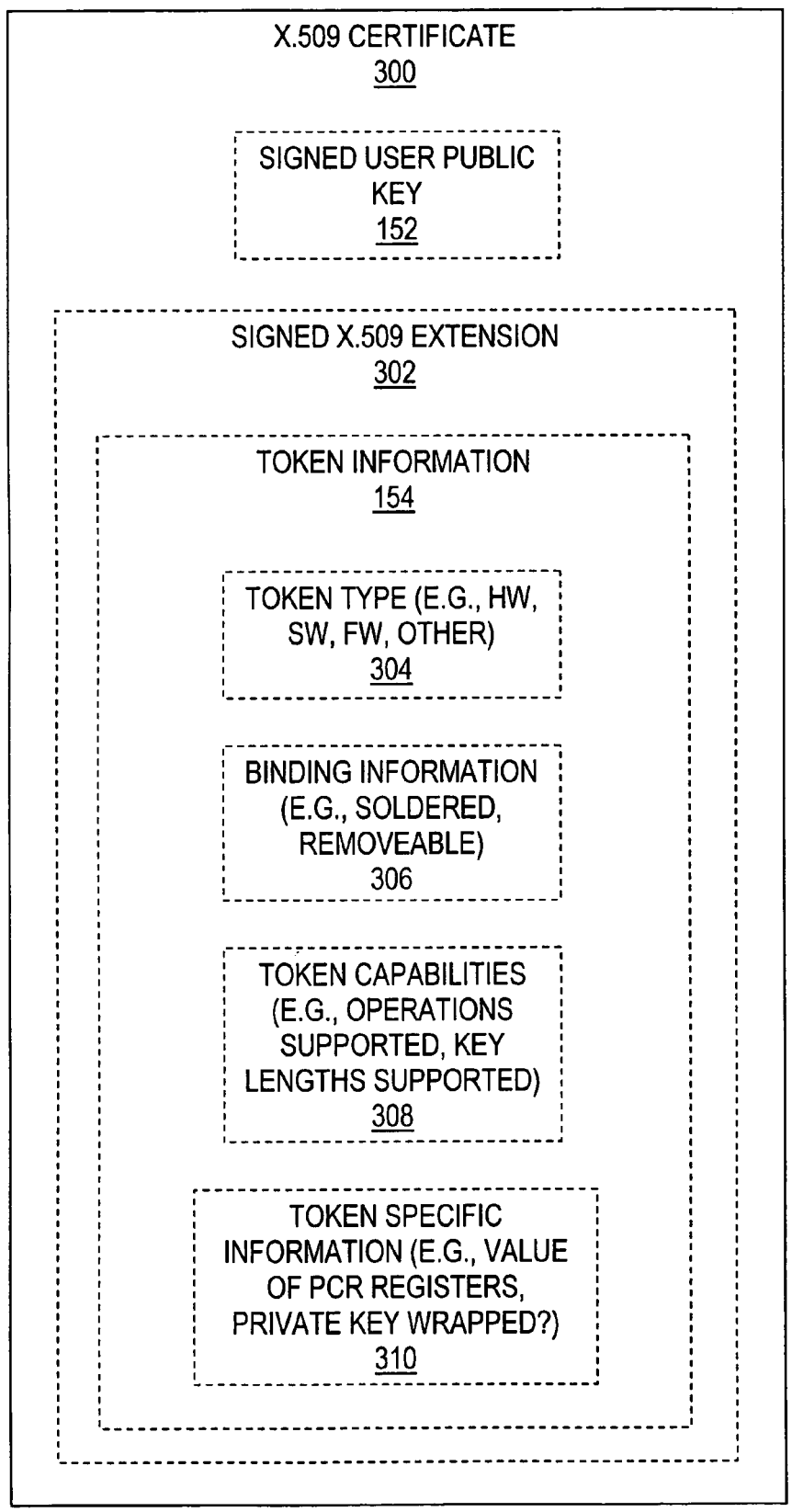
FIG. 3 shows a digital certificate in accordance with embodiments of the invention.

FIG. 3 shows a X.509 certificate 300 in accordance with embodiments of the invention. As shown in FIG. 3, the X.509 certificate 300 comprises a signed user public key field 152 that stores a signed user public key. The X.509 certificate 300 also comprises a signed extension 302. Based on the X.509 Version 3 specification, the extension 302 is able to be defined and implemented by anyone. Thus, in at least some embodiments, a vendor may use the one or more data fields of the extension 302 to provide the token information 154.

As shown, the token information 154 comprises one or more data fields such as a "token type" field 304, a "binding information" field 306, a "token capabilities" field 308 and a "token specific information" field 310. In at least some embodiments, the token type field 304 provides data that identifies the category of a cryptographic token. For example, categories such as "hardware (HW) token," "software (SW) token," "firmware (FW) token," or "other" token may be used. Additionally or alternatively, the token type field 304 may provide data that identifies specific cryptographic tokens such as a TPM.

The binding information field 306 provides data that identifies how the cryptographic token is "bound" to a platform. For example, the binding information field 306 may identify a token as being soldered, removable or some other binding description. The token capabilities field 308 provides data that describes capabilities of a cryptographic token such as cryptographic operations that are supported, the strengths of key lengths that are supported or other capabilities. The token specific information field 310 provides data that identifies specific information relating the token to the certificate 300. For example, the token specific information may be the values of the Platform Configuration Registers (PCRs) at the time of the certificate creation (in the case of a TPM token). The token specific information also may identify whether the private key is encrypted or "wrapped" by the token.

The token information 154 also may comprise other information or parameters as described previously. For example, the token information 154 may indicate a token identification number, a token name, a token alias, a standard (specification) related to the token, a token key strength, a Common Criteria Evaluation Assurance Level (CC EAL) or other conformance criteria, a platform certificate uniform resource location (URL), a manufacturer of the cryptographic token, a manufacturer of a computer system that implements the cryptographic token, whether the user private key is migrate-able or non-migrate-able, or whether the user private key 116 (or the certificate 150) is stored external to or internal to an associated platform. Again, the token information described herein is not exhaustive (i.e., more information, less information or different information may be provided).

Returning to FIG. 2, after the trust determination instructions 234 determine some level of trust based on the token information 154 and/or verifying at least some of the token information, the action determination instructions 236, when executed, cause the processor 222 to perform an action based on the determined level of trust. For example, if the determined level of trust is greater than a threshold level, the action determination instructions 236 cause the processor 222 to allow a trusted transaction or a trusted communication. If the determined level of trust is less than a threshold level, the action determination instructions 236 cause the processor 222 to disallow or prevent a trusted transaction or a trusted communication. Other possible actions supported by the action determination instructions 236 include, but are not limited to, limiting or allowing access to a secure network (e.g., a corporate network), limiting or allowing access to resources of a secure network, limiting or allowing access to web-based email, and limiting or allowing access to file shares.

The additional levels of trust provided by the token information 154 and/or by verifying the token information 154 can also be used for non-repudiation of trusted transactions. For example, if the token information 154 identifies a specific platform and is verified, evidence on a claim that a trusted transaction was fraudulent is provided, since the transaction verifiably originated from a particular platform.

Figure 4:
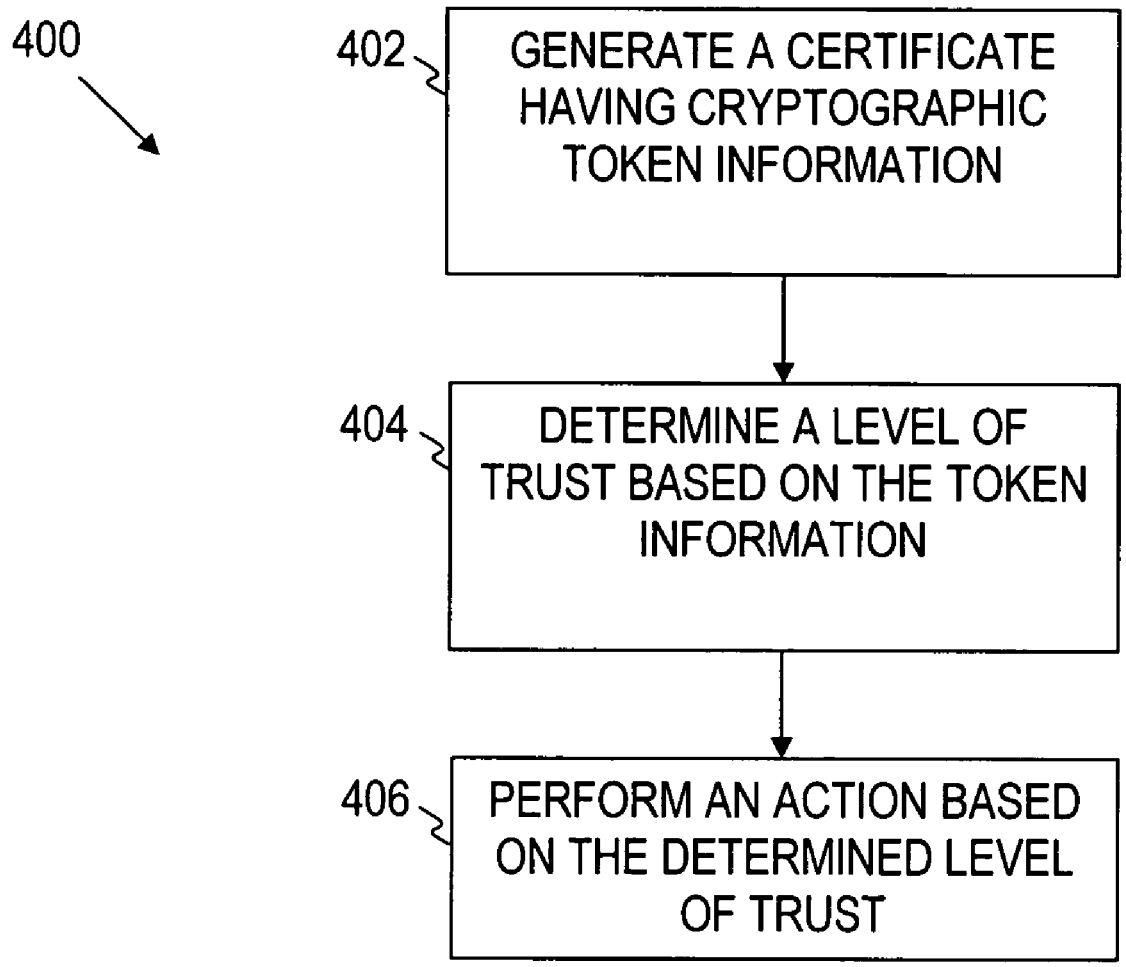
FIG. 4 shows a method in accordance with embodiments of the invention.

FIG. 4 shows a method 400 in accordance with embodiments of the invention. As shown in FIG. 4, the method 400 comprises generating a digital certificate having cryptographic token information (block 402). The token information may comprise token types, binding information, token capabilities, token specific information or other information as previously described. In some embodiments, the token information is provided in a certificate extension such as an x.509 certificate extension. The method 400 further comprises determining a level of trust based on the token information (block 404). In at least some embodiments, the level of trust is determined independently from other techniques for establishing trust (e.g., a private key operation or verifying a signature). Also, a higher level of trust can be established by verifying the token information. Finally, an action is performed based on the determined level of trust (block 406). For example, if the level of trust is greater than a threshold amount, a trusted transaction or trusted communication is allowed. If the level of trust is less than a threshold amount, a trusted transaction or trusted communication is limited in scope or not allowed. Other actions include, but are not limited to, limiting or allowing access to a secure network (e.g., a corporate network), limiting or allowing access to resources of a secure network, limiting or allowing access to web-based email, limiting or allowing access to file shares, or non-repudiation actions.

What is claimed is:

1. A method, comprising:
   obtaining, by a challenger device, a digital public-key certificate that stores a parameter of a cryptographic token that protects a private key associated with the digital public-key certificate;
   requesting, by the challenger device, a signature verification for the digital public-key certificate; and
   establishing, by the challenger device, a level of trust with the digital public-key certificate based on the parameter of the cryptographic token, said level of trust being separate from said signature verification and being independent from other challenger devices.

2. The method of claim 1 wherein the level of trust is established without verifying the parameter.

3. The method of claim 2 further comprising increasing the level of trust based on verifying the parameter after said obtaining.

4. The method of claim 1 further comprising providing the parameter of the cryptographic token in an extension of the digital public-key certificate.

5. The method of claim 1 further comprising identifying, by the challenger device, whether the cryptographic token is hardware, firmware, or software, based on the parameter.

6. The method of claim 1 further comprising identifying, by the challenger device, how the cryptographic token is bound to a platform based on the parameter.

7. The method of claim 1 further comprising identifying, by the challenger device, a cryptography technique implemented by the cryptographic token based on the parameter.

8. The method of claim 1 further comprising identifying, by the challenger device, a unique identity of the cryptographic token based on the parameter.

9. The method of claim 1 further comprising allowing at least one of a trusted communication and a trusted transaction if the level of trust is greater than a threshold value.

10. The method of claim 1 further comprising using the parameter to identify attributes of the cryptographic token, the attributes being selected from the group consisting of:
whether the cryptographic token is a hardware token;
whether the cryptographic token is a software token;
whether the cryptographic token is a firmware token;
at least one platform configuration register (PCR) value;
whether an associated private key is encrypted using the cryptographic token;
whether an associated private key is stored externally to an associated platform;
whether an associated private key is stored internally to an associated platform;
cryptographic operations that are supported by the cryptographic token;
cryptographic key lengths that are supported by the cryptographic token;
a token identification number;
a token name;
a token alias;
a standard related to the cryptographic token;
whether an associated private key is migrate-able;
whether the token is soldered to an associated platform;
whether the token in removeably coupled to an associated platform;
a Common Criteria Evaluation Assurance Level (CC EAL);
a platform certificate uniform resource location (URL);
a manufacturer of the cryptographic token; and
a manufacturer of a computer system that implements the cryptographic token.

11. The method of claim 1 further comprising using the parameter provided with the digital public-key certificate to identify the cryptographic token as a hardware token and to identify at least one platform configuration register (PCR) value.

12. The method of claim 1 further comprising using the parameter provided with the digital public-key certificate to identify an encryption status and a location of the private key.

13. The method of claim 1 further comprising using the parameter provided with the digital public-key certificate to identify a cryptographic capability and a unique identity of the cryptographic token.

14. A non-transitory storage medium that stores a digital public-key certificate, the digital public-key certificate comprising:
a data field having a signed user public key; and
at least one additional data field that stores a characteristic of a cryptographic token that protects a private key associated with the digital public-key certificate, the characteristic being at least one of a physical characteristic and an operative characteristic,
wherein said characteristic of the cryptographic token enables challenger devices that receive the digital public-key certificate to vary a challenger-specific trust level for the digital public-key certificate, said challenger-specific trust level being separate from signature verification for the digital public-key certificate.

15. The storage medium of claim 14 wherein the at least one additional data field is provided by an extension of the digital public-key certificate.

16. The storage medium of claim 15 wherein the digital public-key certificate is a X.509 Version 3 certificate.

17. The storage medium of claim 14 wherein the characteristic identifies the token as a Trusted Platform Module (TPM).

18. The storage medium of claim 14 wherein the characteristic identifies an attribute of the cryptographic token, the attribute being selected from the group consisting of:
whether the cryptographic token is a hardware token;
whether the cryptographic token is a software token;
whether the cryptographic token is a firmware token;
at least one platform configuration register (PCR) value;
whether an associated private key is encrypted using the cryptographic token;
whether an associated private key is stored externally to an associated platform;
whether an associated private key is stored internally to an associated platform;
cryptographic operations that are supported by the cryptographic token;
cryptographic key lengths that are supported by the cryptographic token;
a token identification number;
a token name;
a token alias;
a standard related to the cryptographic token;
whether an associated private key is migrate-able;
whether the token is soldered to an associated platform;
whether the token in removeably coupled to an associated platform;
a Common Criteria Evaluation Assurance Level (CC EAL);
a platform certificate uniform resource location (URL);
a manufacturer of the cryptographic token; and
a manufacturer of a computer system that implements the cryptographic token.

19. The storage medium of claim 14 wherein the characteristic identifies the cryptographic token as a hardware token and identifies at least one platform configuration register (PCR) value.

20. The storage medium of claim 14 wherein the characteristic identifies a unique identity of the cryptographic token and its removability from a platform.

* * * * *